United States Patent
Palazzolo et al.

(10) Patent No.: US 8,633,625 B2
(45) Date of Patent: Jan. 21, 2014

(54) SHAFT-LESS ENERGY STORAGE FLYWHEEL

(75) Inventors: Alan Palazzolo, College Station, TX (US); Randall Tucker, Sommerville, TX (US); Zhiyang Wang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 13/231,720

(22) Filed: Sep. 13, 2011

(65) Prior Publication Data
US 2012/0062058 A1    Mar. 15, 2012

Related U.S. Application Data

(60) Provisional application No. 61/382,769, filed on Sep. 14, 2010.

(51) Int. Cl.
*H02K 7/09*    (2006.01)
(52) U.S. Cl.
USPC .......................................... 310/90.5; 310/153
(58) Field of Classification Search
USPC .................. 310/90.5, 153, 152, 74
See application file for complete search history.

(56) References Cited

U.S. PATENT DOCUMENTS

| | | | | |
|---|---|---|---|---|
| 4,065,189 A * | 12/1977 | Sikorra | ..................... | 310/90.5 |
| 6,114,788 A * | 9/2000 | Vuillemin (Muller) et al. | .......................... | 310/90.5 |
| 6,323,614 B1 | 11/2001 | Palazzolo et al. | | |
| 7,429,811 B2 | 9/2008 | Palazzolo et al. | | |
| 2004/0256935 A1 | 12/2004 | Kenny et al. | | |
| 2008/0122308 A1* | 5/2008 | Mleux | ........................ | 310/90.5 |

* cited by examiner

*Primary Examiner* — Dang Le
(74) *Attorney, Agent, or Firm* — Fletcher Yoder P.C.

(57) ABSTRACT

Embodiments of the present invention include a shaft-less energy storage flywheel system. The shaft-less energy storage flywheel system includes a solid cylindrical flywheel having permanent motor magnets mounted about the flywheel. The shaft-less energy storage flywheel system also includes a motor stator having motor windings carrying electrical currents. The motor windings of the motor stator are aligned with the permanent motor magnets of the flywheel such that rotation of the flywheel is induced through interaction of the motor winding currents and the magnetic field of the permanent motor magnets. The flywheel provides a magnetic flux path for the permanent motor magnets. In certain embodiments, the shaft-less energy storage flywheel system includes a magnetic bearing assembly disposed directly adjacent an axial face of the flywheel. The magnetic bearing assembly controls positioning and alignment of the flywheel without physically contacting the flywheel during normal operation.

20 Claims, 9 Drawing Sheets

SHAFT-LESS ENERGY STORAGE FLYWHEEL

CROSS-REFERENCE TO RELATED APPLICATIONS

This application claims priority of U.S. Provisional Patent Application No. 61/382,769, filed Sep. 14, 2010, which is herein incorporated in its entirety by reference.

BACKGROUND OF THE INVENTION

Energy storage flywheels accumulate and store energy in the form of kinetic energy of a spinning inertia. In other words, an energy storage flywheel stores kinetic energy by essentially continually spinning. When desired, the kinetic energy stored in the flywheel may be accessed and released by transferring the kinetic energy. For example, the energy stored in a typical flywheel may be released as electrical power by engaging a shaft coupled to the flywheel with a generator. Typical energy storage flywheel systems consist of a large inertia wheel coupled to a motor-generator via a shaft. During certain periods, the motor typically converts input energy into stored kinetic energy (e.g., via rotation of the large inertia wheel), and the generator converts the stored kinetic energy into electrical energy. For example, taking into consideration a power plant and a power distribution grid, during periods of lower electricity use (e.g., nighttime), electrical energy may be stored in the flywheel, whereas during periods of higher electricity use (e.g., daytime), the electrical energy may be extracted from the flywheel and directed back into the electrical grid.

Energy storage flywheels have several typical applications. One typical application for energy storage flywheels is regenerative braking. This may include regenerative braking of trains, vehicles, and wind turbines, and braking drill strings as they are lowered into an oil or gas well. Another typical application for energy storage flywheels is providing peak power-assist for vehicles, machinery, and other processes. For example, this technique may be used for the purposes of lowering surcharges from power utilities for peak power demand, obtaining more efficient machinery by designing for efficiency without the constraint of meeting peak power demand, eliminating some machines from a cluster if they only function as peak power sources, and allowing the remaining machines to operate at higher loading, which typically yields higher efficiencies. Yet another typical application for energy storage flywheels includes acting as mechanical batteries for storing energy until the energy/power is required for local usage, or until power curtailment is lifted and the stored flywheel energy is delivered to the grid.

As described in greater detail below, traditional energy storage flywheels are attached to or integrated with long shafts, separate motor-generators coupled to the shafts, and separate bearing assemblies coupled to the shafts. As such, it is now recognized that conventional energy storage flywheel systems can occupy a large amount of space and be extremely expensive to manufacture. Further, it is now recognized that techniques for making energy storage flywheel systems more compact, more efficient, and less expensive are desired.

BRIEF DESCRIPTION OF THE INVENTION

Certain embodiments commensurate in scope with the originally claimed invention are summarized below. These embodiments are not intended to limit the scope of the claimed invention, but, rather, these embodiments are intended only to provide a brief summary of possible forms of the invention. Indeed, the invention may encompass a variety of forms that may be similar to or different from the embodiments set forth below.

One embodiment of the present invention includes a shaft-less energy storage flywheel system. The shaft-less energy storage flywheel system includes a solid cylindrical flywheel having permanent motor magnets mounted about the flywheel. The shaft-less energy storage flywheel system also includes a motor stator having motor windings carrying electrical currents. The motor windings of the motor stator are aligned with the permanent motor magnets of the flywheel such that rotation of the flywheel is induced through interaction of the motor winding currents and the magnetic field of the permanent motor magnets. The flywheel provides a magnetic flux path for the permanent motor magnets. In certain embodiments, the shaft-less energy storage flywheel system includes a magnetic bearing assembly disposed directly adjacent an axial face of the flywheel. The magnetic bearing assembly controls positioning and alignment of the flywheel without physically contacting the flywheel during normal operation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
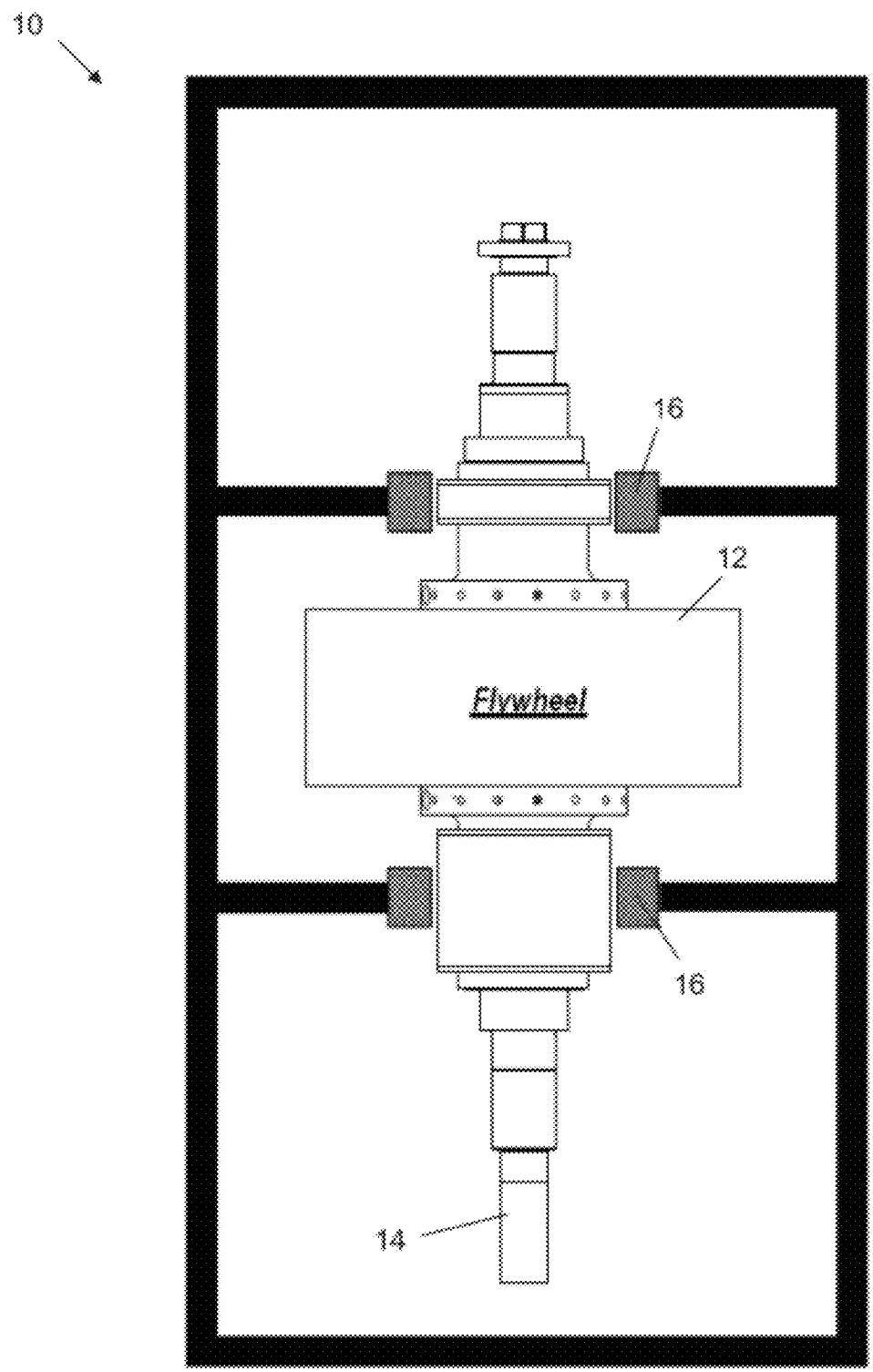
FIG. 1 is a plan view of a typical conventional energy storage flywheel system.

FIG. 1 is a plan view of a typical conventional energy storage flywheel system 10. As illustrated, the conventional energy storage flywheel system 10 includes a flywheel 12 mounted on, or integral with, a shaft 14 supported by bearings 16 that are disposed on opposite sides of the flywheel 12. The same shaft 14 typically also supports a motor-generator (not shown) to convert electrical power into kinetic energy in the flywheel 12 in an energy storage (charging) mode of operation, and to convert kinetic energy from the flywheel 12 into electrical power in a power (power delivery) mode of operation.

It is now recognized that the use of a shaft 14 can increase costs as well as the space required by the conventional energy storage flywheel system 10. In addition, it is now recognized that the energy storage capacity of the conventional energy storage flywheel system 10 can be degraded in several key ways by the shaft 14 and/or features that function with the shaft 14. For example, a hole in the flywheel 12 that is typically required to attach the flywheel 12 to the shaft 14 may nearly double the stresses in the flywheel 12. This drastically lowers the maximum speed of the flywheel 12 and, therefore, also drastically reduces the energy storage capacity of the flywheel 12. While the hole in the flywheel 12 may be avoided if the shaft 14 and the flywheel 12 are manufactured as a single integral part, this involves machining off a large portion of the initial material (e.g., forging) to obtain the relatively small diameter shaft sections. This significantly increases the manufacturing costs due to machining time and wasted materials.

Another complication with conventional flywheel systems are issues associated with material strengthening of system components when a shaft is present. Material strengthening may be accomplished through heat treatment including quenching stages that accelerate cooling of the flywheel 12. However, segments of the shaft 14 may prevent portions of the flywheel 12 that are near the shaft 14 from cooling at the intended quench rates, creating a non-uniform strength distribution in the flywheel 12. Thus, the segments of the shaft 14 may preclude an effective heat treatment with quenching, resulting in a weakening of the material of the flywheel 12 in certain regions, thereby reducing the speed and the energy storage capability of the flywheel 12. In addition, the shaft 14, by necessity, increases the overall length of the conventional energy storage flywheel system 10, thereby occupying space that could otherwise be utilized for additional energy storage components.

Figure 2:
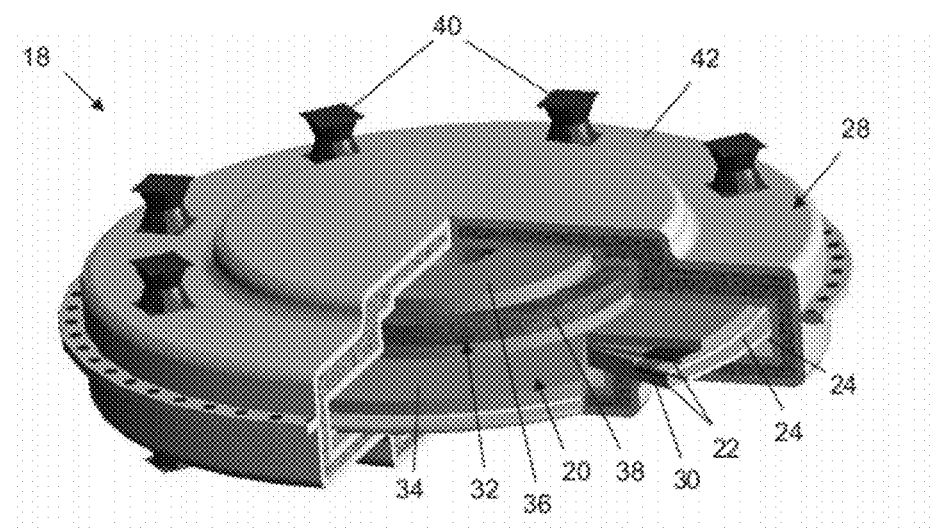
FIGS. 2 and 3 are perspective cutaway views of an exemplary embodiment of a shaft-less energy storage flywheel system.
Figure 3:
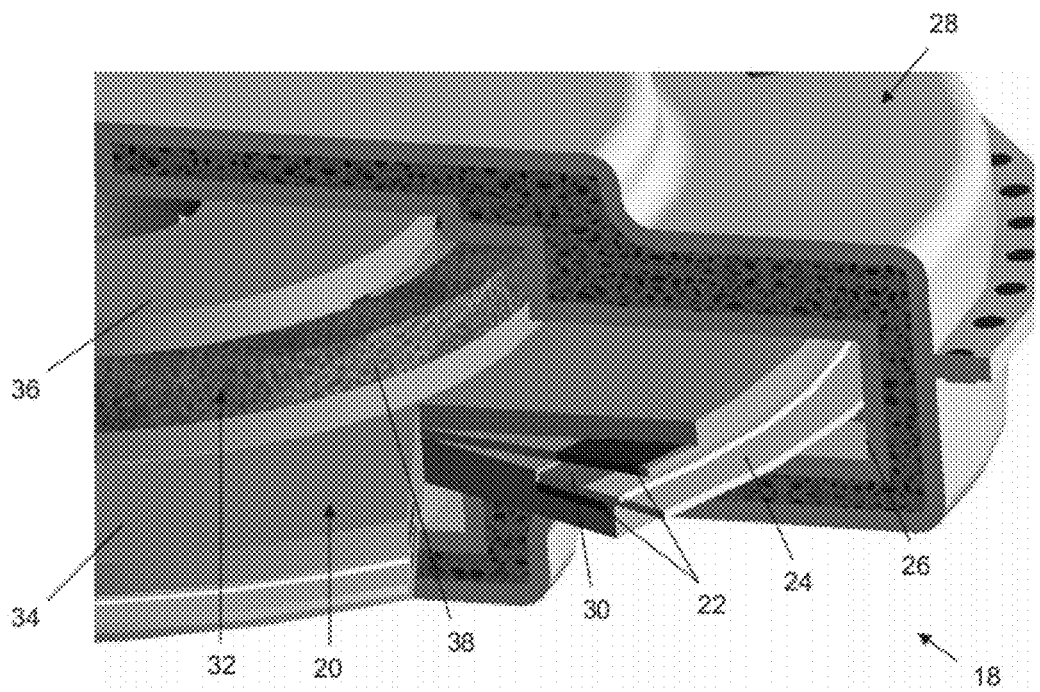
Figure 8:
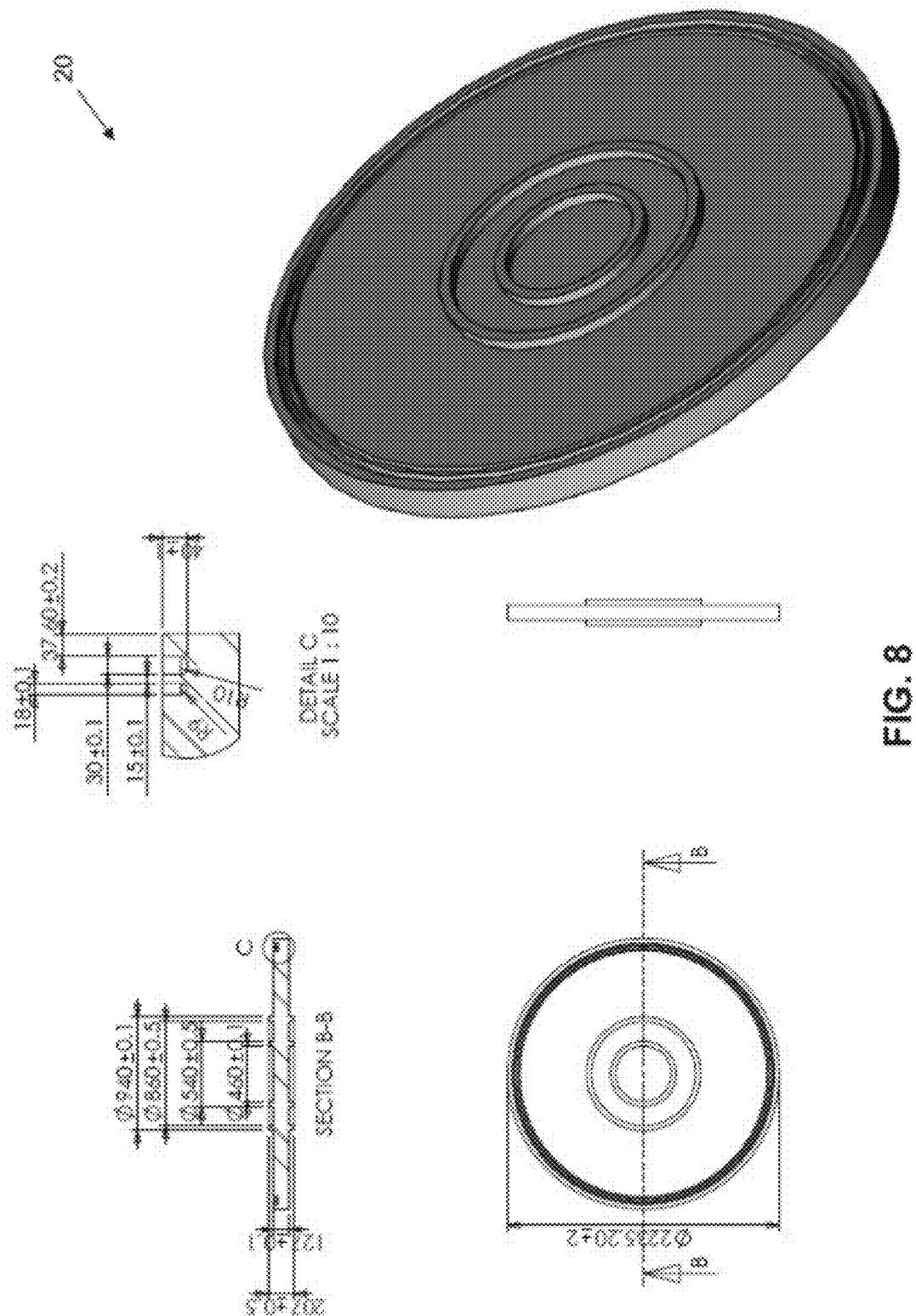
FIGS. 8 and 9 illustrate several views of two separate exemplary embodiments of the flywheel.
Figure 9:
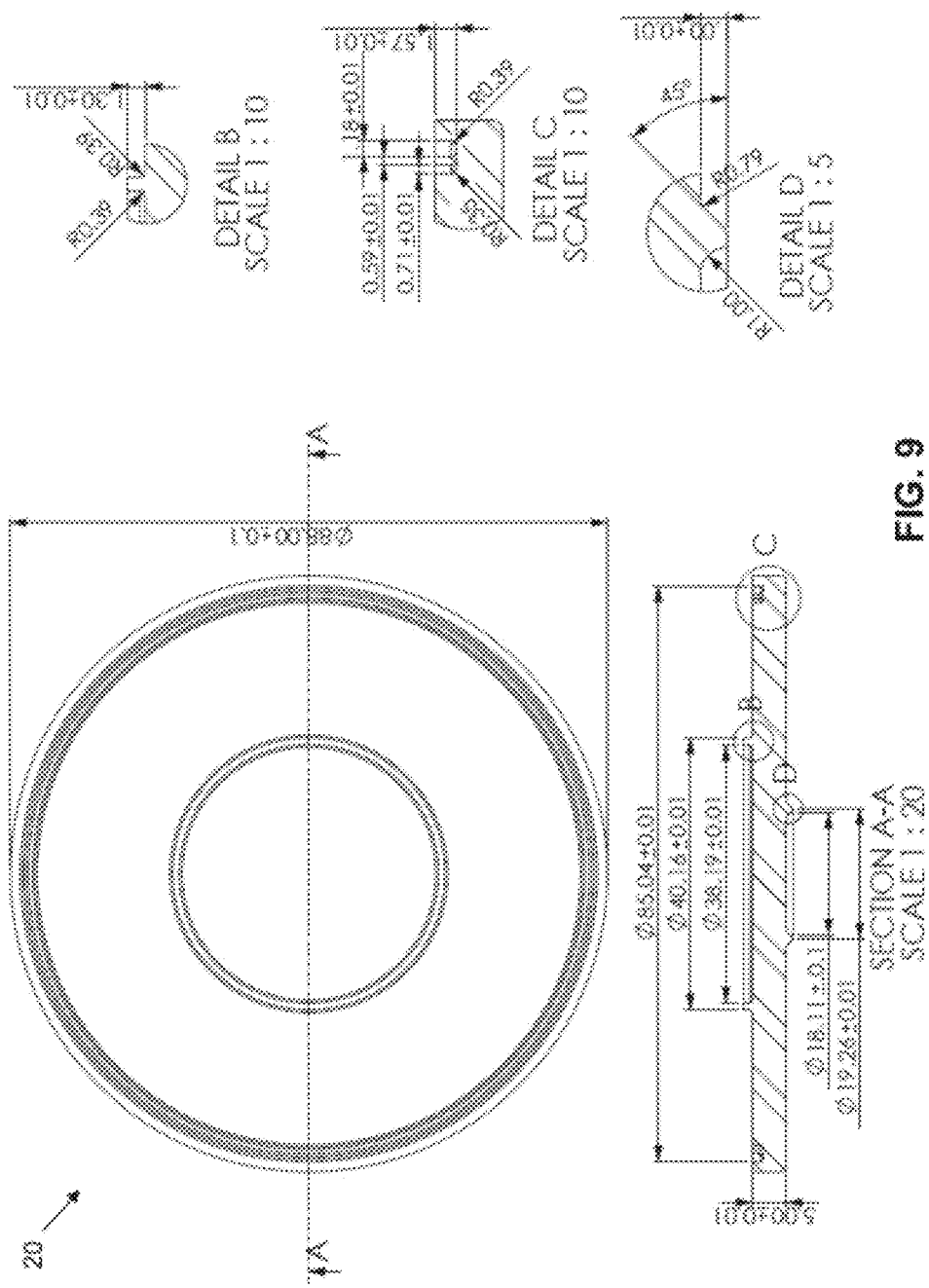

Embodiments described herein address these and other shortcomings of the conventional energy storage flywheel system 10 by not utilizing a shaft to support the flywheel, the bearings, or the motor-generator. Rather, in the disclosed embodiments, the bearings and motor-generator are built into a flywheel. For example, FIGS. 2 and 3 are perspective cutaway views of an exemplary embodiment of a shaft-less energy storage flywheel system 18. As described in greater detail below, no shaft is used in the shaft-less energy storage flywheel system 18 to couple a flywheel 20, bearings, and motor-generator together. As such, no hole is required in the flywheel 20 of the shaft-less energy storage flywheel system 18. Rather, as illustrated in FIGS. 8 and 9, the flywheel 20 is formed as a solid, one-piece construction. Therefore, the energy storage capacity issues associated with conventional flywheels that are attached to shafts may be reduced or even eliminated in accordance with present embodiments.

As described above, flywheels are usually coupled to motor-generators, such that the motor receives input power from a power source (e.g., a local utility grid or renewable energy source) and stores the energy in the flywheel via the inertia of the rotating flywheel. Subsequently, the stored kinetic energy in the flywheel is transferred out of the flywheel by operating the flywheel motor as a generator, which exerts a drag torque on the flywheel, thereby decreasing its speed. However, the embodiments described herein function differently in that the motor-generator is built into the flywheel 20.

Permanent motor magnets 22 are positioned about the flywheel 20. More specifically, returning now to FIGS. 2 and 3, the motor magnets 22 are embedded directly into the flywheel 20 near the outer circumference of the flywheel 20. In other embodiments, the motor magnets 22 may be attached to an outer portion of the flywheel 20 or positioned differently. Further, in some embodiments, the motor magnets 22 may include only a single magnet that passes completely or substantially around the flywheel 20, or multiple magnets distributed around the flywheel 20. In the embodiment illustrated in FIGS. 2 and 3, the motor magnets 22 are strips (segments) embedded within the body of the flywheel 20. However, as described in greater detail below, in other embodiments, the motor magnets 22 are embedded in grooves machined into a face of the flywheel 20. As illustrated in the embodiment of FIGS. 2 and 3, the shaft-less energy storage flywheel system 18 includes a motor stator 24, which is a relatively thin strip of material extending from an inner wall 26 of a flywheel casing 28, within which the flywheel 20 is encased. As such, the motor stator 24 remains fixed while the flywheel 20 rotates within the flywheel casing 28.

In addition, the motor stator 24 and the motor magnets 22 function as the motor-generator, which can cause rotation of the flywheel 20 to store kinetic energy, and transfer the stored kinetic energy from the flywheel 20. More specifically, the motor stator 24 includes the motor windings 30 for carrying electrical currents that act against the magnetic fields of the motor magnets 22 of the flywheel 20. As such, the motor-generator components of the shaft-less energy storage flywheel system 18 illustrated in FIGS. 2 and 3 are at least partially integrated directly into the flywheel 20, thereby eliminating the need for a shaft to couple the flywheel 20 to a separate motor-generator. In other words, by providing a flux path, the flywheel 20 itself forms part of the motor-generator, such that a shaft is unnecessary to transfer energy to/from the flywheel 20 and the motor-generator.

Present embodiments facilitate constraining motion of the flywheel 20 while also minimizing drag losses for the shaft-less energy storage flywheel system 18 described herein. Indeed, because the flywheel 20 may rotate for long periods of time, it is desirable to reduce drag losses from bearings to conserve the kinetic energy stored in the flywheel 20. As described above, conventional flywheel systems, such as the system 10 illustrated in FIG. 1, typically utilize two or more sets of bearings that are disposed on opposite sides of the flywheel, and which constrain motion of the shaft connected to the flywheel. However, as described above, the shaft-less energy storage flywheel system 18 does not utilize a shaft. Rather, the bearings of the shaft-less energy storage flywheel system 18 interact directly with the flywheel 20.

More specifically, the embodiments described herein include magnetic bearing assemblies 32 that interact directly with one or both faces (e.g., top and bottom faces) of the flywheel 20. For example, as illustrated in FIGS. 2 and 3, a magnetic bearing assembly 32 is located directly adjacent a top face 34 of the flywheel 20. In general, the magnetic bearing assembly 32 does not physically contact the flywheel 20 during rotation of the flywheel 20. Rather, the magnetic bearing assembly 32 generates magnetic fields that pull the flywheel 20 to its targeted position and orientation, thereby effectively causing the flywheel 20 to levitate instead of creating friction forces common in conventional bearings. More specifically, electrical currents may be selectively applied to poles of the magnetic bearing assembly 32 to selectively adjust how the magnetic fields affect the flywheel 20. In addition, in certain embodiments, sensors within the flywheel casing 28 may provide information relating to position and motion of the flywheel 20, thereby enabling feedback and control of the flywheel 20 via the magnetic bearing assembly 32. As described in greater detail below, the magnetic bearing assembly 32 may include a radial bearing 36 and/or an axial bearing 38, which respectively constrain radial and/or axial movement of the flywheel 20.

As also described in greater detail below, in certain embodiments, a separate catcher bearing may also be used to physically catch the flywheel 20 in the event of power failures or other undesirable events, thereby reducing unwanted contact between the flywheel 20 and the magnetic bearing stator components (e.g., the radial bearing 36 and the axial bearing 38). In addition, in certain embodiments, a plurality of vibration isolators 40 may be attached to an outer surface 42 of the flywheel casing 28. The vibration isolators 40 may allow for slight movement of the flywheel casing 28, thereby reducing unwanted vibrational movement of the flywheel casing 28 during power failures or undesirable events.

Figure 4:
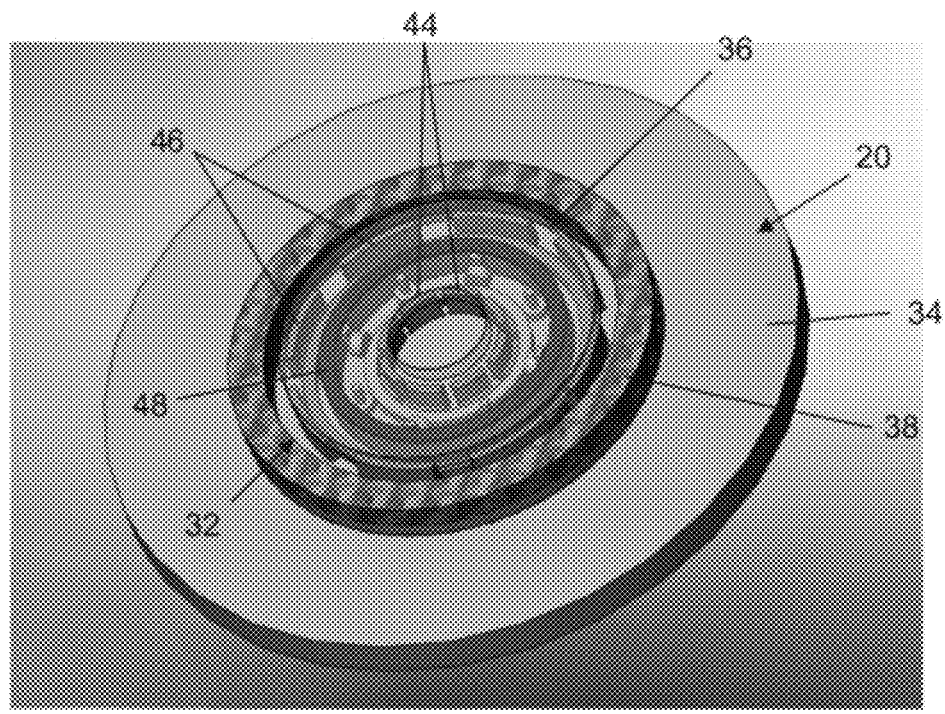
FIG. 4 is a perspective view of an exemplary embodiment of the flywheel and the magnetic bearing assembly of FIGS. 2 and 3.

FIG. 4 is a perspective view of an exemplary embodiment of the flywheel 20 and the magnetic bearing assembly 32 of FIGS. 2 and 3. As illustrated, the magnetic bearing assembly 32 includes the radial bearing 36 and the axial bearing 38. It should be noted that only the inner components of the radial bearing 36 are shown for illustration purposes. More specifically, the main body of the radial bearing 36 is not shown to aid visualization of the inner components of the radial bearing 36. For example, as illustrated, the radial bearing 36 includes a plurality of inner poles 44, a plurality of outer poles 46, and an annular ring 48 between the plurality of inner poles 44 and the plurality of outer poles 46. The inner poles 44, outer poles 46, and annular ring 48 (as well as the main body) of the radial bearing 36 are affixed to the flywheel casing 28 described above and, as such, remain stationary during rotation of the flywheel 20. The inner poles 44 may either be physically separated from each other or may be used as a solid ring. Similarly, the outer poles 46 may either be physically separated from each other or may be used as a solid ring. Currents are selectively applied to the plurality of inner poles 44 and the plurality of outer poles 46 to generate the magnetic fields that help position and stabilize the flywheel 20 during operation. The radial bearing 36 may be above (e.g., on a first axial side of) the flywheel 20, below (e.g., on a second axial side of) the flywheel 20, or above and below (e.g., on both a first and second axial side of) flywheel 20. As illustrated, the magnetic bearing assembly 32 also includes the axial bearing 38, which is located radially outside of the radial bearing 36 in the illustrated embodiment. The axial bearing 38 is also affixed to the flywheel casing 28 described above and, as such, also remains stationary during rotation of the flywheel 20. The axial bearing 38 may be above (e.g., on a first axial side of) the flywheel 20, below (e.g., on a second axial side of) the flywheel 20, or above and below (e.g., on both a first and second axial side of) the flywheel 20.

The radial bearing 36 and the axial bearing 38 function together to provide a magnetic suspension that exerts positioning (and control) forces and moments in five main directions. In particular, the radial bearing 36 and axial bearing 38 exert: (a) a radial force $f_{r1}$ parallel to the plane (e.g., parallel to the top face 34) of the flywheel 20 in a fixed direction, (b) a radial force $f_{r2}$ parallel to the plane (e.g., parallel to the top face 34) of the flywheel 20 in a fixed direction that is 90 degrees rotated from the radial force $f_{r1}$, (c) an axial force $f_a$ in a direction perpendicular to the plane (e.g., parallel to the top face 34) of the flywheel 20, (d) a moment $m_{r1}$ about the axis of the radial force $f_{r1}$, and (e) a moment $m_{r2}$ about the axis of the radial force $f_{r2}$. Radial forces $f_{r1}$, $f_{r2}$ position and stabilize the flywheel 20 in the radial direction. Axial force $f_a$ positions and stabilizes the flywheel 20 in the axial direction (typically, but not always, the weight direction). Moments $m_{r1}$, $m_{r2}$ control the tilt of the flywheel 20 and may be supplied by the radial bearing 36, the axial bearing 38, both the radial and axial bearings 36, 38, or by a separate magnetic tilt bearing (not shown).

Figure 5:
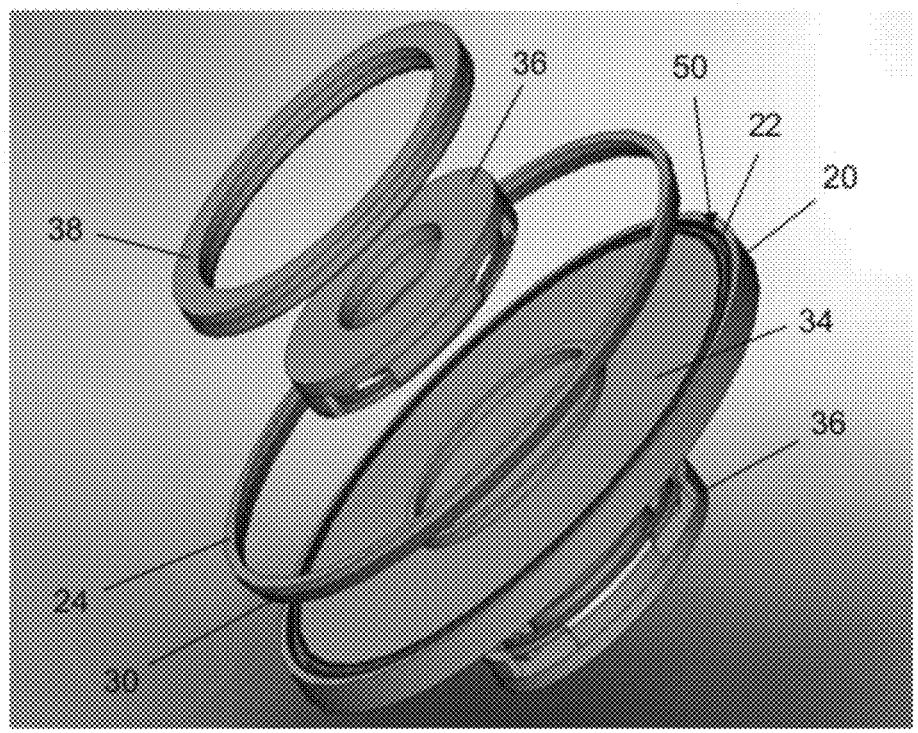
FIG. 5 is an exploded view of an exemplary embodiment of the main components of the shaft-less energy storage flywheel system.

FIG. 5 is an exploded view of an exemplary embodiment of the main components of the shaft-less energy storage flywheel system 18. In particular, the embodiment illustrated in FIG. 5 includes one axial bearing 38 above the flywheel 20, and two radial bearings 36, one above (e.g., on a first axial side of) and one below (e.g., on a second axial side of) the flywheel 20. However, it should be noted that the motor-generator components of the embodiment illustrated in FIG. 5 are slightly different than the embodiment illustrated in FIGS. 2 and 3. In particular, the embodiment illustrated in FIG. 5 includes a motor stator 24 that is located adjacent the top face 34 of the flywheel 20 and generally aligns with one or more grooves 50 extending circumferentially around the top face 34 of the flywheel 20. The grooves 50 in the top face 34 of the flywheel 20 have motor magnets 22 embedded in them. As such, similar to the embodiment of FIGS. 2 and 3, the flywheel 20 operates as the motor rotor, capable of being induced into rotation and/or generating electricity via currents in the motor windings 30 that are disposed on an axial side of the motor stator 24. The motor windings 20 extend from the motor stator 24 to generally align with the permanent motor magnets 22 embedded in the grooves 50 in the top face 34 of the flywheel 20. As such, the embodiment illustrated in FIG. 5 is different than the embodiment illustrated in FIGS. 2 and 3 in three main ways: (a) the permanent magnet polarization direction of the motor magnets 22 on the flywheel 20, (b) the coil turn direction of the motor windings 30 on the motor stator 24, and (c) the stator coil insertion direction into the magnetic fields created by the motor magnets 22 on the flywheel 20.

As described above, in certain embodiments, the motor stator 24 of FIG. 5 may be affixed to the flywheel casing 28. However, the embodiment illustrated in FIG. 5 makes clearer the movable nature of the motor stator 24. As such, the motor stator 24 may be moved (e.g., translated axially with respect to the flywheel 20) to enable variable immersion of the motor windings 30 of the motor stator 24 into the magnetic fields created by the permanent motor magnets 22 on the flywheel 20. Varying the immersion amount varies the level of torque developed per unit current through the motor windings 30, and varies the level of voltage generated per unit speed of the flywheel 20. These ratios are referred to as the torque-per-current and voltage-per-speed gains, or sometimes simply as the motor constants. Varying these gains in a systematic manner significantly increases the amount of energy stored by, or discharged from, the flywheel 20.

The embodiment illustrated in FIG. 5 enables the motor windings 30 of the motor stator 24 to be raised or lowered to vary the extent that the motor windings 30, which are mounted on the motor stator 24, become immersed in the magnetic fields created by the permanent motor magnets 22 mounted on the flywheel 20. As such, the electromotive force coefficient of the motor-generator (i.e., the motor windings 30 of the motor stator 24 and the permanent motor magnets 22 mounted on the flywheel 20) may be continuously adjusted. For example, in certain embodiments, axial movement of the motor stator 24 relative to the flywheel 20 may be selectively adjusted based on operating conditions of the shaft-less energy storage flywheel system 18 (e.g., via feedback received from sensors indicating speed, voltage and current, or other operating conditions, for the flywheel 20 and/or its power or load sources). In addition, when there is no energy exchange to/from the shaft-less energy storage flywheel system 18, the motor stator 24 may be removed entirely from the shaft-less energy storage flywheel system 18 (or moved substantially away from the flywheel 20) to reduce the motor losses to substantially zero, thereby improving the efficiency of the shaft-less energy storage flywheel system 18.

Figures 6, 7:
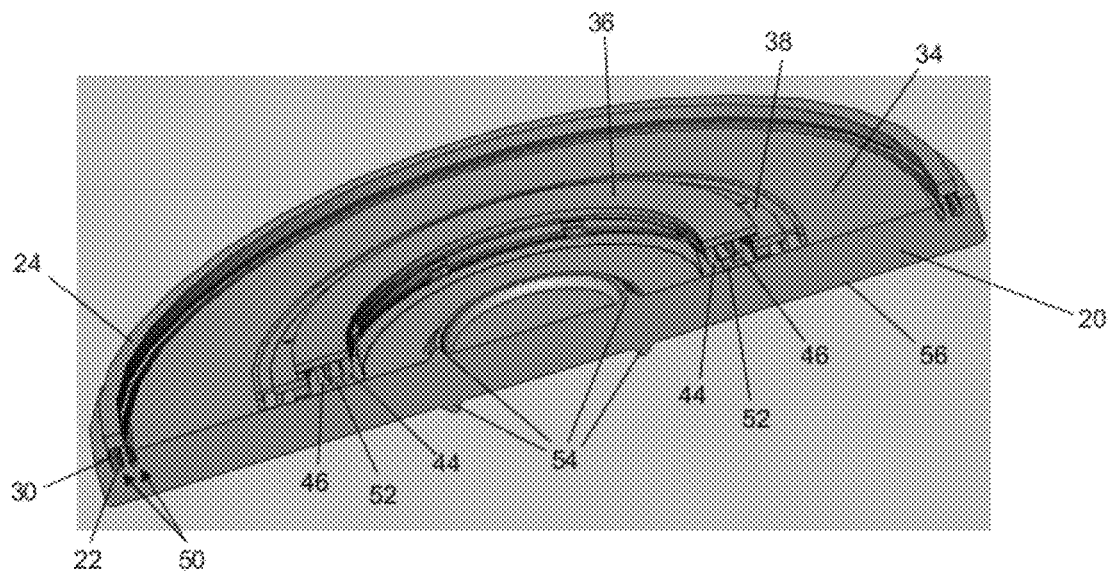
FIG. 6 is a perspective cutaway view of exemplary embodiments of the flywheel, motor stator, radial bearing, and axial bearing.
FIG. 7 is a cutaway perspective view of an exemplary embodiment of the shaft-less energy storage flywheel system.

FIG. 6 is a perspective cutaway view of exemplary embodiments of the flywheel 20, motor stator 24, radial bearing 36, and axial bearing 38. In particular, FIG. 6 illustrates how the motor stator 24, radial bearing 36, and axial bearing 38 align with the flywheel 20 during operation of the shaft-less energy storage flywheel system 18. As described above, none of the motor stator 24, radial bearing 36, or axial bearing 38 physically contacts the flywheel 20 when the flywheel 20 is rotating. As such, friction losses are minimized and the kinetic energy stored in the shaft-less energy storage flywheel system 18 is more efficiently conserved.

As illustrated, the annular-shaped motor stator 24 generally aligns with the grooves 50 that extend circumferentially around the top face 34 of the flywheel 20. The grooves 50 contain the embedded motor magnets 22 such that the motor windings 30 extending from the motor stator 24 also generally align with the motor magnets 22. This configuration facilitates the generation of electrical currents from the motor windings 30 that act against the permanent motor magnets 22, which causes the flywheel 20 to rotate when the shaft-less energy storage flywheel system 18 is in a charging mode of operation, and enables extraction of the kinetic energy when the shaft-less energy storage flywheel system 18 is in a power delivery mode of operation. As also illustrated in FIG. 6, the radial bearing 36 generally aligns with an annular radial bearing step 52 extending from the top face 34 of the flywheel 20. In particular, the plurality of inner poles 44 and the plurality of outer poles 46 are disposed on opposite sides of the annular radial bearing step 52, and aid in the positioning and alignment of the flywheel 20 via magnetic fields generated by the inner poles 44 and the outer poles 46.

The flywheel 20 illustrated in FIG. 6 also includes a first annular catcher bearing step 54 extending from the top face 34 of the flywheel 20 and a second annular catcher bearing step 54 extending from a bottom face 56 of the flywheel 20. Catcher bearings may be used on both sides (e.g., adjacent the top and bottom faces 34, 56) of the flywheel 20 to provide braking or prevent physical contact between the flywheel 20 and the flywheel casing 28 during a failure or malfunction.

FIG. 7 is a cutaway perspective view of an exemplary embodiment of the shaft-less energy storage flywheel system 18. The embodiment illustrated in FIG. 7 only includes a catcher bearing assembly 58 on the bottom side of the flywheel 20. However, a separate catcher bearing assembly 58 may also be used on the top side of the flywheel 20. The catcher bearing assembly 58 may include a catcher bearing 60, which may be a ball bearing, a roller bearing, a dry contact (sleeve) bearing, or any other suitable type of bearing. During operation, due at least in part to the levitation provided by the magnetic bearing assemblies 32 (e.g., the radial bearings 36 and the axial bearings 38), a body 62 of the catcher bearing assembly 58 held in place within the catcher bearing 60 may not physically contact the flywheel 20 or, more specifically, the annular catcher bearing step 54 extending from the flywheel 20. However, in the event of a power outage or undesirable event, the catcher bearing assembly 58 physically catches the flywheel 20, thereby minimizing unwanted contact of the flywheel 20 with the other components of the shaft-less energy storage flywheel system 18. Although not illustrated in the embodiment of FIG. 7, in certain embodiments, a radial bearing 36 and/or an axial bearing 38 may be used on the bottom side of the flywheel 20.

Figure 10:
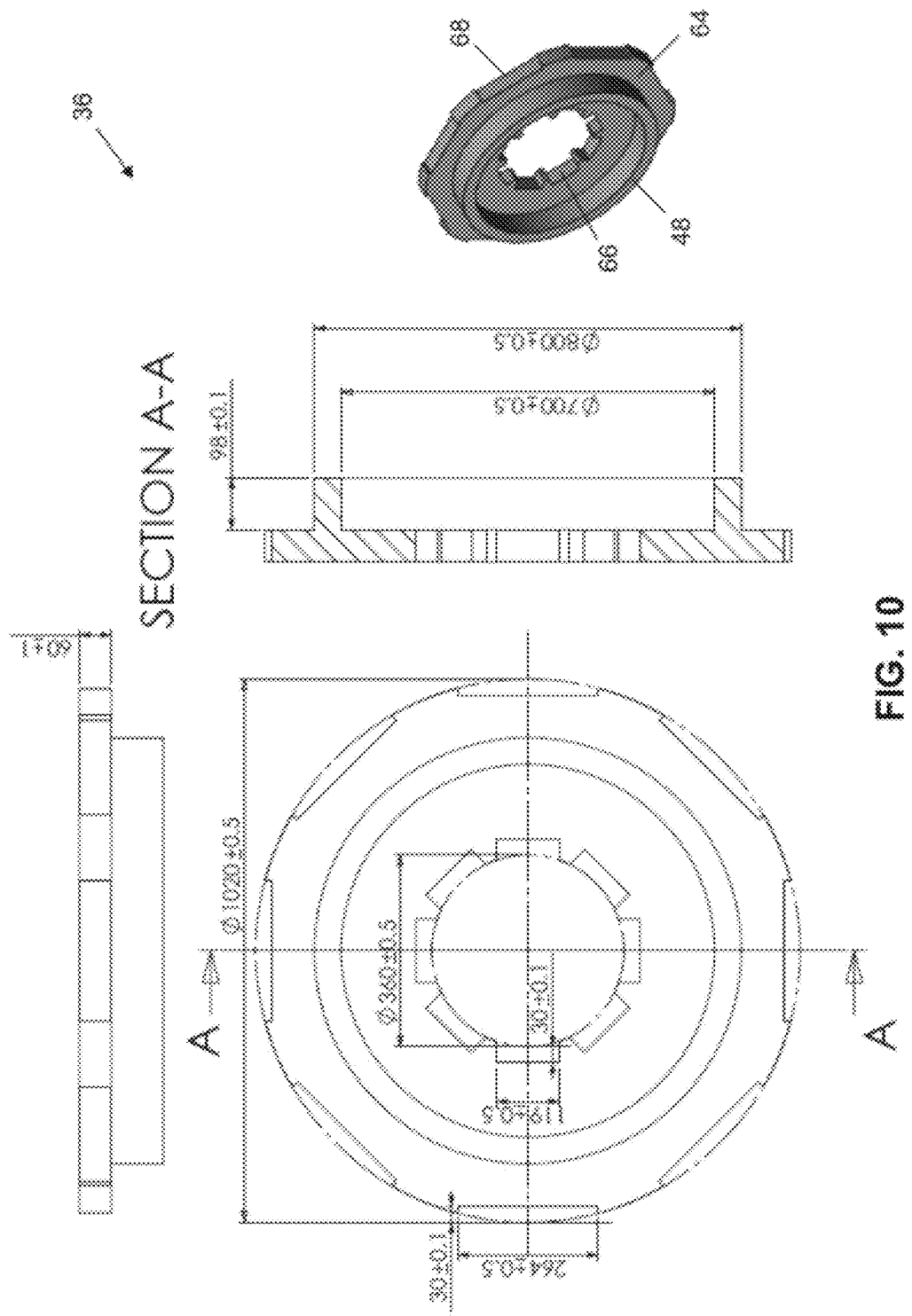
FIG. 10 illustrates several views of an exemplary embodiment of a main body and annular ring of the radial bearing.
Figure 11:
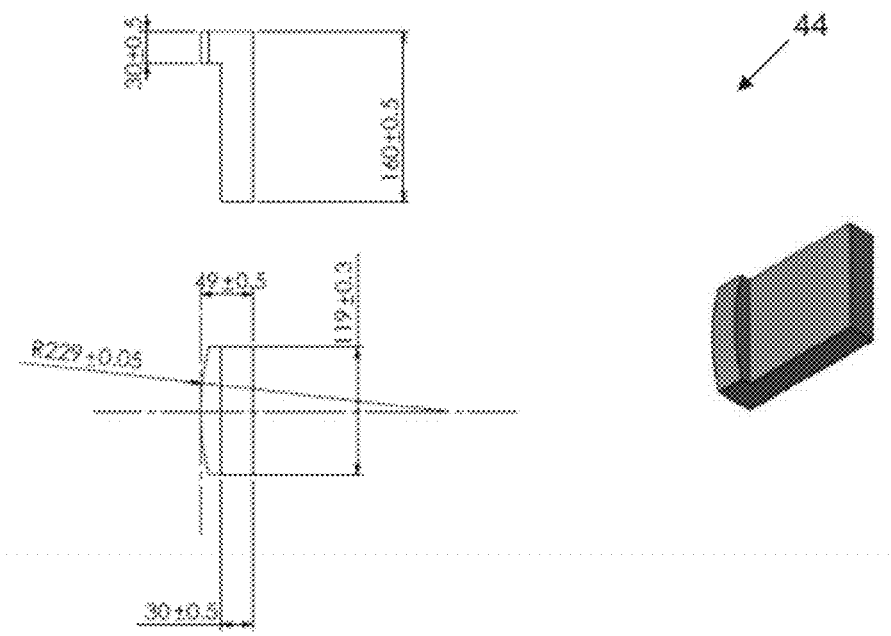
FIG. 11 illustrates several views of exemplary embodiments of the inner poles of the radial bearing.
Figure 12:
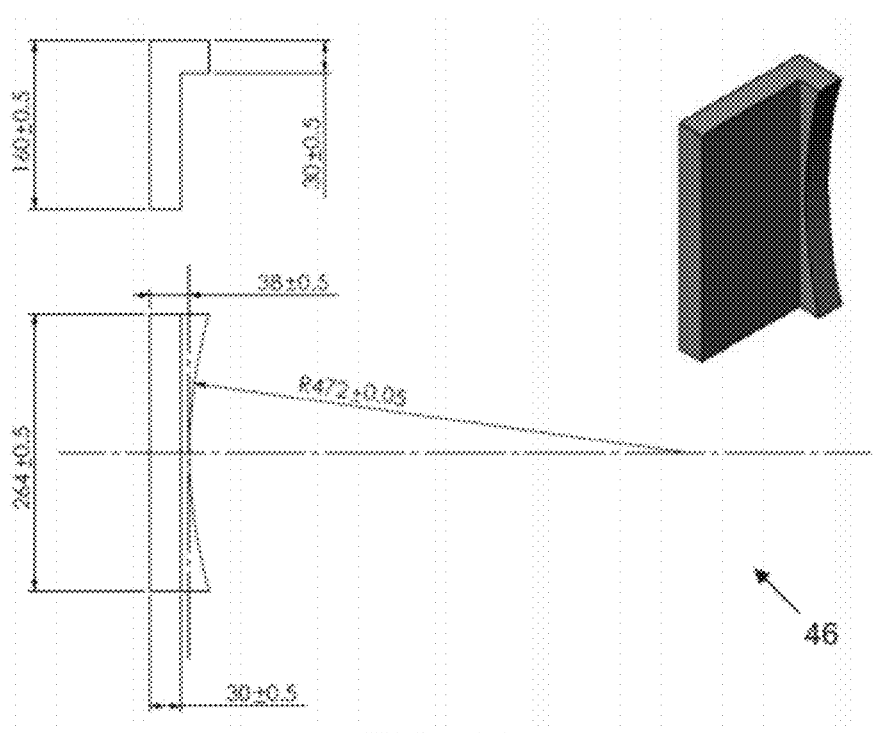
FIG. 12 illustrates several views of exemplary embodiments of the outer poles of the radial bearing.
Figure 13:
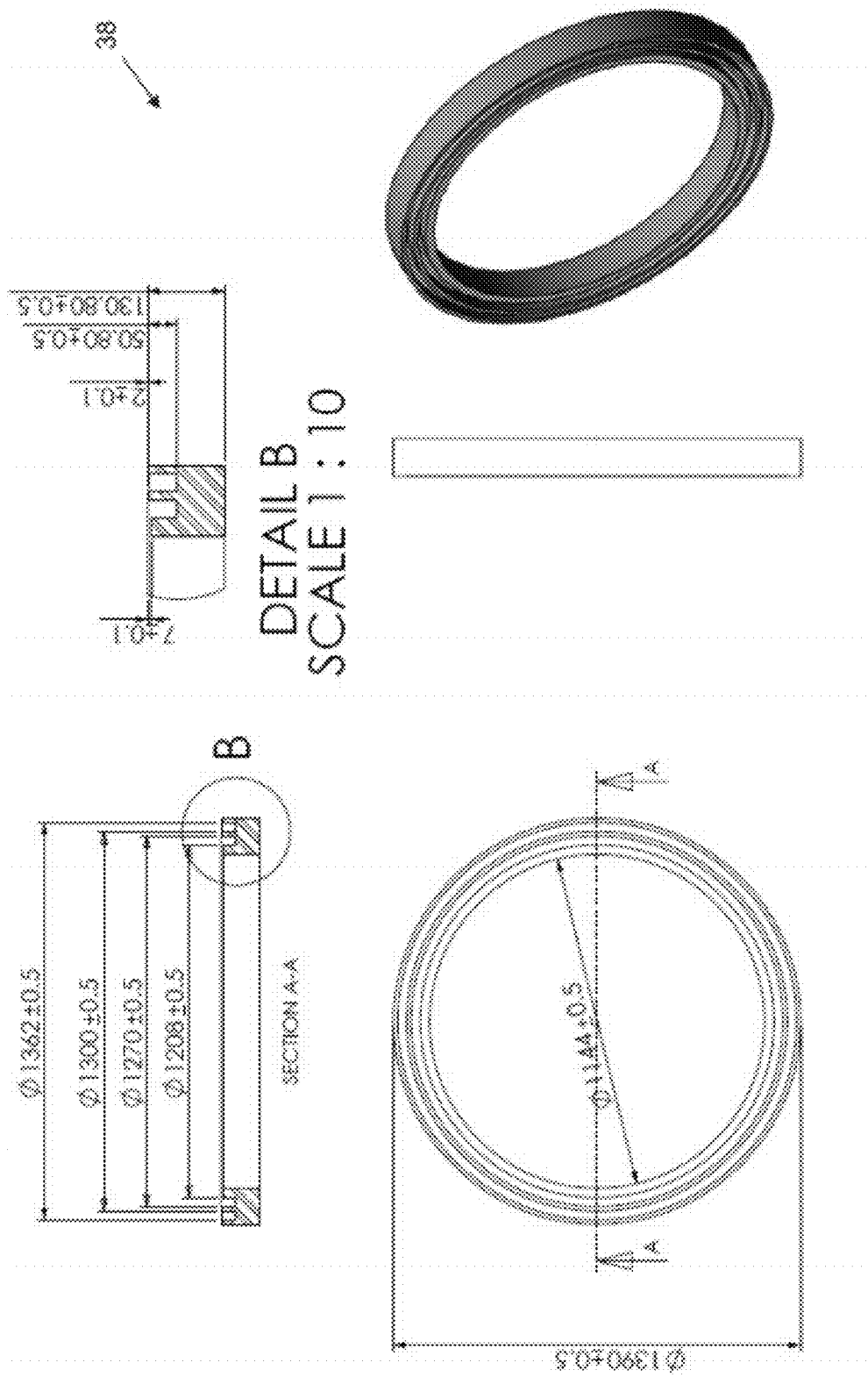
FIG. 13 illustrates several views of an exemplary embodiment of the axial bearing.

FIGS. 8 through 13 illustrate various views of several components of the shaft-less energy storage flywheel system 18. In particular, FIGS. 8 and 9 illustrate several views of two separate exemplary embodiments of the flywheel 20; FIG. 10 illustrates several views of an exemplary embodiment of the main body 64 and annular ring 48 of the radial bearing 36; FIG. 11 illustrates several views of exemplary embodiments of the inner poles 44 of the radial bearing 36; FIG. 12 illustrates several views of exemplary embodiments of the outer poles 46 of the radial bearing 36; and FIG. 13 illustrates several views of an exemplary embodiment of the axial bearing 38. The dimensions shown in FIG. 9 are in inches, whereas the dimensions shown in FIGS. 8 and FIGS. 10 through 13 are in millimeters. The dimensions are provided only as examples, since the range of possible sizes of the flywheel 20 extends from much smaller to much larger than those indicated by the exemplary dimensions. It should be noted that, as illustrated in FIG. 10, the main body 64 of the radial bearing 36 includes a plurality of inner cutout sections 66 and a plurality of outer cutout sections 68, within which the plurality of inner poles 44 (illustrated in FIG. 11) and the plurality of outer poles 46 (illustrated in FIG. 12) may be affixed, respectively.

As described above, the embodiments described herein include a shaft-less energy storage flywheel system 18. In particular, the motor-generator (e.g., the motor magnets 22 of the flywheel 20 and the motor windings 30 of the motor stator 24) of the shaft-less energy storage flywheel system 18 is at least partially integrated directly into the flywheel 20, as evidenced by motor magnetic flux being partially carried by the flywheel 20 as the motor rotor. As such, the integrated motor-generator components do not require a shaft to transfer energy to/from the flywheel 20 during operation of the shaft-less energy storage flywheel system 18. In addition, the bearings (e.g., the radial bearings 36, axial bearings 38, and optional catcher bearing assemblies 58) of the shaft-less energy storage flywheel system 18 are disposed directly adjacent the flywheel 20 and utilize the flywheel 20 to carry the magnetic bearing flux. As such, the integrated magnetic bearing components do not require a shaft to transmit bearing forces to support the flywheel 20 during operation of the shaft-less energy storage flywheel system 18. However, the bearings of the shaft-less energy storage flywheel system 18 do not physically contact the flywheel 20 during operation of the shaft-less energy storage flywheel system 18. As such, drag losses are minimized for the shaft-less energy storage flywheel system 18.

Because no shaft is used, the flywheel 20 may be constructed as a solid, one-piece flywheel. As such, because no hole is needed to attach the flywheel 20 to a shaft, the maximum stresses the flywheel 20 incurs at a given speed are drastically reduced and, therefore, the maximum speed and energy storage capacity are drastically increased. In addition, because the shape of the flywheel 20 is fairly simple (i.e., a relatively thin but wide cylindrical shape), the flywheel 20 may be manufactured as a solid piece without significantly increased costs due to, for example, excessive forging. Similarly, material strengthening through heat treatment of the solid flywheel 20 is simplified, enabling uniform strength distribution throughout the flywheel 20, which leads to an overall stronger flywheel 20. In addition, the shaft-less energy storage flywheel system 18 described herein is much more compact than conventional flywheel energy storage systems that include relatively long shafts. However, despite the compact nature of the shaft-less energy storage flywheel system 18, the increased strength enables higher rotational speeds (e.g., up to or exceeding 4500 rpm), leading to very high kinetic energy storage capacity. In addition, simulations have shown that the increased performance of the shaft-less energy storage flywheel system 18 may be achieved without laminating the flywheel 20, which is an added cost benefit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A shaft-less energy storage flywheel system, comprising:
   a solid cylindrical flywheel having permanent motor magnets embedded in grooves extending circumferentially around a face of the flywheel; and
   a motor stator having motor windings carrying electrical currents, wherein the motor windings of the motor stator are disposed on a side of the motor stator and inserted into the grooves of the flywheel to align the motor windings with the permanent motor magnets of the flywheel such that rotation of the flywheel is primarily induced through interaction of the motor winding currents and the magnetic field of the permanent motor magnets, wherein the flywheel provides a magnetic flux path for the permanent motor magnets.

2. The system of claim 1, wherein the motor stator is axially translatable with respect to the grooves of the flywheel to vary an amount of immersion of the motor windings into the magnetic field.

3. The system of claim 2, wherein axial translation of the motor stator with respect to the grooves of the flywheel is selectively adjusted based on operating conditions of the system.

4. The system of claim 1, comprising a magnetic bearing assembly disposed directly adjacent an axial face of the flywheel, wherein the magnetic bearing assembly controls positioning and alignment of the flywheel without physically contacting the flywheel during normal operation, and utilizes the flywheel as a magnetic flux path.

5. The system of claim 4, comprising a catcher bearing assembly disposed adjacent the flywheel, wherein the catcher bearing assembly physically catches the flywheel when the magnetic bearing assembly is not controlling positioning and alignment of the flywheel.

6. The system of claim 4, wherein the magnetic bearing assembly comprises a radial bearing and an axial bearing, which constrain radial, axial, and tilt motions of the flywheel.

7. The system of claim 6, wherein the radial bearing comprises a plurality of inner poles and a plurality of outer poles, wherein the plurality of inner poles are disposed on a radial side of a main body of the radial bearing opposite the plurality of outer poles.

8. The system of claim 7, wherein the plurality of inner poles and the plurality of outer poles are removable from the radial bearing.

9. The system of claim 1, comprising only one motor stator.

10. The system of claim 1, wherein the motor winding currents and the magnetic field of the permanent motor magnets do not provide primary levitation of the solid cylindrical flywheel with respect to the motor stator.

11. The system of claim 1, wherein rotation of the flywheel is only induced through interaction of the motor winding currents and the magnetic field of the permanent motor magnets.

12. A shaft-less energy storage flywheel system, comprising:
    a solid cylindrical flywheel having permanent motor magnets embedded within an interior portion of a body of the flywheel; and
    a motor stator having motor windings carrying electrical currents, wherein the motor stator is a thin strip of material extending radially inward from an inner wall of a flywheel casing within which the flywheel is encased, wherein the motor windings of the motor stator are aligned with the permanent motor magnets within the interior portion of the body of the flywheel such that rotation of the flywheel is primarily induced through interaction of the motor winding currents and the magnetic field of the permanent motor magnets, wherein the flywheel provides a magnetic flux path for the permanent motor magnets.

13. The system of claim 12, comprising a magnetic bearing assembly disposed directly adjacent an axial face of the flywheel, wherein the magnetic bearing assembly controls positioning and alignment of the flywheel without physically contacting the flywheel during normal operation, and utilizes the flywheel as a magnetic flux path.

14. The system of claim 13, comprising a catcher bearing assembly disposed adjacent the flywheel, wherein the catcher bearing assembly physically catches the flywheel when the magnetic bearing assembly is not controlling positioning and alignment of the flywheel.

15. The system of claim 13, wherein the magnetic bearing assembly comprises a radial bearing and an axial bearing, which constrain radial, axial, and tilt motions of the flywheel.

16. The system of claim 15, wherein the radial bearing comprises a plurality of inner poles and a plurality of outer poles, wherein the plurality of inner poles are disposed on a radial side of a main body of the radial bearing opposite the plurality of outer poles.

17. The system of claim 16, wherein the plurality of inner poles and the plurality of outer poles are removable from the radial bearing.

18. The system of claim 12, comprising only one motor stator.

19. The system of claim 12, wherein the motor winding currents and the magnetic field of the permanent motor magnets do not provide primary levitation of the solid cylindrical flywheel with respect to the motor stator.

20. The system of claim 12, wherein rotation of the flywheel is only induced through interaction of the motor winding currents and the magnetic field of the permanent motor magnets.

* * * * *